3,436,837
FLUIDIZED BED FREEZE DRYING
Ira Abelow and Jack Wagman, Frederick, Md., assignors to the United States of America as represented by the Secretary of the Army
Filed Aug. 13, 1963, Ser. No. 301,926
Int. Cl. F26b 5/06, 3/08
U.S. Cl. 34—5                                                   6 Claims The invention described herein may be manufactured and used by or for the government for governmental purposes, without payment to us of any royalty thereon.

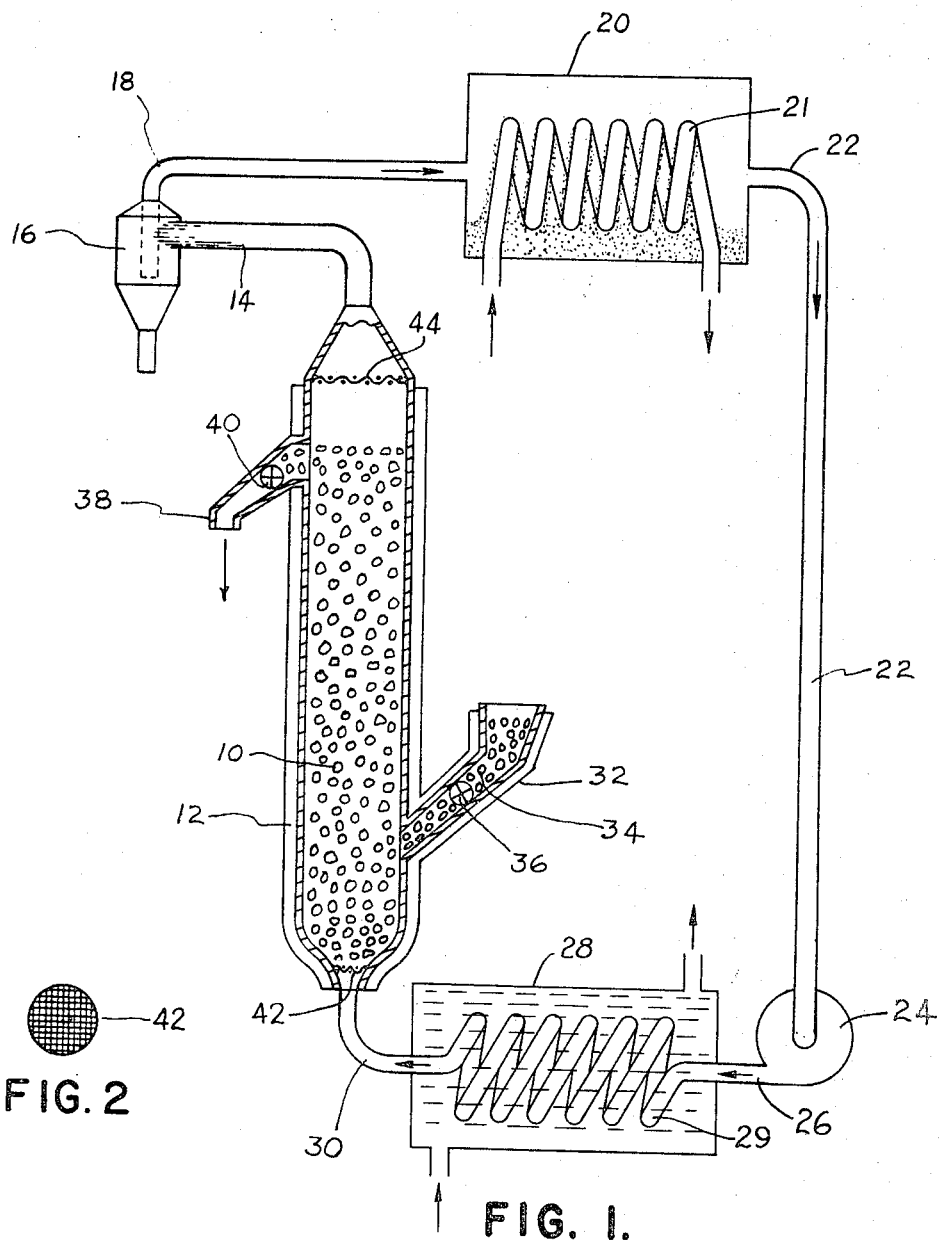

This invention relates to a method of freeze drying utilizing a fluidized bed.

More specifically, it relates to a method of preserving heat sensitive materials including foods, pharmaceuticals and biological substances, by drying them from the frozen state in a fluidized bed created by a flow of dry air or other gases or gas mixtures.

The prior art methods of freeze drying heat sensitive materials were invariably conducted in a vacuum. This required expensive apparatus and high capital and operating costs. It is the object of this invention to accomplish freeze dehydration at reduced capital costs, reduced operating costs and with improved product quality. Finally, this process has greater potential for scaling up to mass production and for making the process continuous.

The process is carried out by freezing small pieces of the product to be dried including cubed meat, cooked peas, or other food material which can be diced or cut into small pieces. Products which are in the form of liquid suspensions or solutions of solids may be made into frozen droplets by pelleting or other means.

The frozen pieces are fed from a refrigerated hopper to a column which is essentially a fluidized bed reactor. This column is insulated or jacketed, and in the latter case a fluid is continuously circulated through the jacket to maintain the temperature inside the column at the desired level. A positive pressure blower, which is mounted in a completely inclosed ducting system, forces air or other suitable gas or gases through a heat exchanger and thence through the bottom of the column and up through the bed of frozen solids in the column at such a rate as to suspend the solids in the gas stream resulting in the formation of a fluidized bed of frozen particulate solids. The temperature and velocity of the gas stream, and the temperature of the fluid in the jacket are controlled at such a level and rate that moisture is removed from the product and dehydration from the frozen state is accomplished. The process lends itself especially well to continuous operation wherein the dried product is continuously removed from the column and conveyed to the packaging area. It is to be understood however that the process is equally applicable to single batch operation, the latter being especially indicated where smaller quantities are dried. In such case drying conditions can readily be altered as the batch is progressively dehydrated. The moist gas stream flows from the top of the column and thence through duct works to a vapor condenser or refrigerated cold trap. In the latter case its moisture is removed by condensation as snow and the dried refrigerated gas is returned to the blower and recycled into the process.

In carrying out the process, all conditions of heat input are so balanced that thawing of the frozen material does not occur. Any fines which result from attrition are carried off in the gas stream and collected in a cyclone separator, placed between the vapor cold trap and the dryer. This process may be carried out at any combination of gas pressure and velocity suitable for fluidization, depending upon the particular bed of frozen solids being freeze dehydrated.

The rate of drying is a function of, and can be controlled by the velocity of the gas through the bed, its temperature, the temperature of the particles, the efficiency of the vapor condenser, and therefore the dew point as well as the quantity of dry gas which is recycled through the system.

In the accompanying drawing, there is illustrated a preferred embodiment of this invention, in which drawing:

FIG. 1 is a schematic illustration with certain portions in section of the equipment used in the present invention, and FIG. 2 is a plan view of the screen element shown in FIG. 1.

In the drawing, 10 shows the drying column with jacket 12. The top of the column is vented in conduit 14 to cyclone separator 16. The take-off conduit 18 from the separator passes to the unit 20 which is a refrigerated cold trap, which is provided with a refrigerating unit 21 maintained at freezing temperatures for removing moisture from the gas. The dried gas then passes through conduit 22 to inlet of positive pressure blower 24. Said blower 24 compresses the dried gas and forces it successively through conduit 26, heat control unit 28, conduit 30, and through the bottom opening of column 10 with sufficient velocity and pressure to fluidize the bed of solid pieces in said column. Supply hopper 32 receives the frozen material 34 to be dried. The rate of entry of said frozen material into column 10 is regulated by star valve 36. Dried pieces are removed from column 10 through dry product take-off 38, and the rate of removal of such dried material is regulated by star valve 40. A fine open screen 42 at the bottom of column 10 prevents material in the bed from dropping through bottom opening of said column when the circulation of gas is interrupted, and fine open screen 44 prevents the solid pieces in the fluidized bed from being blown out through the top opening of column 10 but permits fines to pass through to the cyclone separator 16.

In operation, hopper 32 is charged with a frozen product to be dried and column 10 is supplied from hopper 32. Dried air or other gas or gas mixture is fed through this bed by means of blower 24 at such a rate and pressure that the bed is fluidized. Any fines that result from the operation are carried over through conduit 14 and are deposited in cyclone separator 16. The gas which is now laden with moisture continues on through refrigerated vapor trap 20 where the moisture is removed and the dew point reduced. The gas then continues through the blower 24 and on to heat control 28. Said control is illustrated for simplicity as a coiled duct 29 submerged in a temperature bath 31, although any conventional means may be employed to transfer heat to the conveyed gas. The temperature of the gas may be raised to further lower the relative humidity and to provide heat of sublimation. It should be noted however that the temperature of the gas is never raised above the point required to maintain the material in the fluidized bed in column 10 in a frozen state. Moreover blower 24 is operated at a rate that guarantees a fluidized bed in column 10. In this column, the drier material because of lowered bulk density gradually migrates to the top of the fluidized bed. It is possible therefore to withdraw such dried material through product take-off 38 as it reaches the top of the fluidized column. The material to be dried is admitted into column 10 at the same rate as dried material is withdrawn through product take-off 38. By this means it is possible to make what is normally a batch operation into a continuous process.

Several modifications are possible without departing from the invention. Thus it is possible to remove moisture from the gas stream which emerges from the fluidized bed by means other than a refrigerated cold trap, for example by adsorption of vapor in sieves or by dehydrating materials.

While atmospheric or higher pressure is usually used, the process could be carried out at less than atmospheric pressure, if this is thought desirable. For example, the operation may be started at atmospheric or slightly higher pressure. As drying proceeds, and the rate of moisture removal declines at the surface of each of the frozen pieces, the pressure can be reduced to a partial vacuum in order to accelerate the removal of moisture.

Under some circumstances of operation it may be desirable to accomplish the drying in a plurality of stages. This is so because the degree of dehydration of the material may dictate changed drying conditions including a change of velocity, dew point and temperature of the gas. By passing the partially dried material into successive stages it is possible to thus change drying conditions and thereby increase the overall efficiency of the process.

Although the process, as described above, utilizes a closed system, wherein the moist gas which emerges from the fluidized bed is dried and recirculated, there is nothing to prevent utilizing the gas, particularly in the case of air, only once and introducing new dry air into the bed continuously if this is considered desirable. The basic requirement of the process is that the material in the form of frozen pieces be suspended in a fluidized bed.

While air will ordinarily be the drying gas of choice for economic reasons, there may be circumstances that require the use of other gases, which are more inert or have superior heat transfer properties and/or higher vapor capacities. Certain gases would be especially useful where the material to be dried was sensitive to oxidation. It is accordingly to be understood that the invention contemplates the use of any suitable gas that will serve to remove the moisture effectively. Although gases are normally the drying fluids of choice, in certain special applications the drying fluid may be a liquid.

While the drawing shows a vertical fluidized bed, it is well known that such beds can also be oriented with the major dimension in a horizontal position. It is to be understood that the present invention contemplates a fluidized bed in either horizontal or vertical orientation.

We claim:
1. A method of drying heat sensitive materials which comprises forming the material into small pieces, freezing same, and drying said frozen pieces suspended in a fluidized bed by a moving stream of drying fluid.

2. A method of drying heat sensitive materials which comprises forming the material into small frozen pieces, passing a stream of relatively dry gas through a bed of said frozen pieces at such a pressure and velocity as to fluidize said bed, thereby accelerating drying by continuous removal of sublimed moisture.

3. A method in accordance with claim 2 wherein dried material is continuously removed from the top of said fluidized bed and material to be dried is continuously added to said bed.

4. A method as recited in claim 2 wherein said frozen pieces comprise frozen pellets of an aqueous suspension.

5. A method for freeze drying a material at essentially atmospheric pressure which comprises:
 (a) freezing particles of the material,
 (b) forming a bed of the frozen particles, and
 (c) injecting a pre-dried gas upwardly through the bed of frozen particles at essentially atmospheric pressure to maintain the bed in a fluidized condition and to dehydrate the particles, the temperature of the injected gas being high enough to be effective to cause sublimation of ice but not so high as to thaw the frozen particles.

6. The process of claim 5 wherein the gas exiting from the bed of frozen particles is redried and recirculated upwardly through said bed.

References Cited
UNITED STATES PATENTS

| | | | |
|---|---|---|---|
| 2,480,954 | 9/1949 | Palmer | 34—5 |
| 3,031,381 | 4/1962 | Langerhans | 34—5 |
| 1,682,318 | 8/1928 | Beardslee | 34—57 |
| 2,278,670 | 4/1942 | Rauer | 34—5 |
| 3,040,439 | 6/1962 | Frost | 34—57 |
| 1,686,719 | 10/1928 | Wood | 34—57 |
| 3,117,064 | 1/1964 | Friedrich | 34—57.7 |
| 2,231,342 | 2/1941 | Loyless | 34—57 |
| 2,751,687 | 6/1956 | Colton | 34—5 |
| 1,589,712 | 6/1926 | Newhouse | 62—320 |
| 2,836,368 | 5/1958 | McCoy | 244—17 |
| 3,070,970 | 1/1963 | Zagar | 62—63 |
| 3,089,253 | 5/1963 | Evans | 34—164 |
| 3,169,381 | 2/1965 | Persson | 62—57 |
| 3,313,032 | 4/1967 | Malecki | 634—5 |

FOREIGN PATENTS 674,935  6/1952  Great Britain.

WILLIAM J. WYE, *Primary Examiner.*

U.S. Cl. X.R.

62—57; 34—57, 10